US008547404B2

(12) United States Patent
Fujine et al.

(10) Patent No.: US 8,547,404 B2
(45) Date of Patent: Oct. 1, 2013

(54) LIQUID CRYSTAL DISPLAY APPARATUS

(75) Inventors: Toshiyuki Fujine, Sakura (JP); Seiji Kohashikawa, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1181 days.

(21) Appl. No.: 11/792,056

(22) PCT Filed: Oct. 16, 2006

(86) PCT No.: PCT/JP2006/320541
§ 371 (c)(1),
(2), (4) Date: Jun. 1, 2007

(87) PCT Pub. No.: WO2007/046320
PCT Pub. Date: Apr. 26, 2007

(65) Prior Publication Data
US 2008/0231581 A1    Sep. 25, 2008

(30) Foreign Application Priority Data

Oct. 18, 2005  (JP) ................................. 2005-302613
Oct. 14, 2006  (JP) ................................. 2006-273084

(51) Int. Cl.
G09G 3/36        (2006.01)
(52) U.S. Cl.
USPC ................ 345/690; 345/89; 345/102; 349/61
(58) Field of Classification Search
USPC ............................. 345/89, 102, 690; 349/61
See application file for complete search history.

(56) References Cited

U.S. PATENT DOCUMENTS 6,329,964 B1 * 12/2001 Tanaka .............................. 345/8
6,795,053 B1    9/2004 Funamoto et al.
(Continued)

FOREIGN PATENT DOCUMENTS
CN    1304522 A    7/2001
CN    1462425 A    12/2003
(Continued)

OTHER PUBLICATIONS

English Computer Translation (provided by the JPO) of Japanese Laid-Open Patent Publication No. 2003-036063.

(Continued)

Primary Examiner — Joseph Feild
Assistant Examiner — Linh N Hoffner
(74) Attorney, Agent, or Firm — Birch, Stewart, Kolasch & Birch, LLP

(57) ABSTRACT

A liquid crystal display apparatus enables image display with optimum quality corresponding to the genre of an image to be displayed. The liquid crystal display apparatus controls the emission luminance of a backlight according to the APL of an image signal measured at an APL measuring portion 14. Upon emission luminance control, the display apparatus sets the follow performance of a change of the backlight emission luminance in following a change in a characteristic quantity of the image signal according to a genre so that the display image can be viewed without an odd feeling. Specifically, the APL of the image signal measured at the APL measuring portion 14 is put into a filter 15, and the rate of a change in the APL on the time axis is controlled through weighted averaging to control the follow performance of the emission luminance control on the backlight. At this time, the genre of image to be displayed is determined, and a constant used for weighted averaging on the filter 15 is changed according to the determined genre to optimize display quality for each genre.

14 Claims, 13 Drawing Sheets

(56) References Cited

U.S. PATENT DOCUMENTS

| | | |
|---|---|---|
| 7,093,941 B2* | 8/2006 | Kawashima et al. ............ 353/97 |
| 2001/0013854 A1* | 8/2001 | Ogoro ............................ 345/102 |
| 2002/0003522 A1* | 1/2002 | Baba et al. ....................... 345/89 |
| 2003/0146919 A1* | 8/2003 | Kawashima et al. ......... 345/609 |
| 2004/0113044 A1* | 6/2004 | Ishiguchi ...................... 250/205 |
| 2004/0141094 A1 | 7/2004 | Kumamoto et al. |
| 2004/0183765 A1* | 9/2004 | Morisawa ........................ 345/89 |
| 2004/0201562 A1* | 10/2004 | Funamoto et al. ............... 345/89 |
| 2004/0257318 A1* | 12/2004 | Itoh ................................. 345/87 |
| 2005/0017990 A1 | 1/2005 | Yoshida |
| 2005/0179821 A1* | 8/2005 | Suga et al. ..................... 348/687 |
| 2005/0259064 A1* | 11/2005 | Sugino et al. ................. 345/102 |
| 2005/0264702 A1* | 12/2005 | Yoshii ............................ 348/687 |
| 2006/0158410 A1 | 7/2006 | Fujine |

FOREIGN PATENT DOCUMENTS

| | | |
|---|---|---|
| EP | 1 383 104 A1 | 1/2004 |
| EP | 1 471 489 A1 | 10/2004 |
| EP | 1 489 853 A2 | 12/2004 |
| EP | 1 865 488 A1 | 12/2007 |
| JP | 3-125333 U | 12/1991 |
| JP | 05-127608 A | 5/1993 |
| JP | 2000-250463 A | 9/2000 |
| JP | 2002-357810 A | 12/2002 |
| JP | 2003-36063 A | 2/2003 |
| JP | 2003-280617 A | 10/2003 |
| JP | 2004-32000 A | 1/2004 |
| JP | 2004-266755 A | 9/2004 |
| JP | 2004-354882 A | 12/2004 |
| KP | 10-2005-0044796 A | 5/2005 |
| TW | 200416436 | 9/2004 |
| WO | WO 2004053826 A1 * | 6/2004 |

OTHER PUBLICATIONS

English Computer Translation (provided by the JPO) of Japanese Laid-Open Patent Publication No. 2004-354882.

* cited by examiner

FIG. 4

| NEWS/REPORT | SPORT | INFORMATION/TABLOID SHOW | DRAMA | MUSIC | VARIETY | MOVIE | CARTOON/SPECIAL EFFECTS | DOCUMENTARY/CULTURE | STAGE/PERFORMANCE | HOBBY/EDUCATION | WELFARE | ADDITION | EXPANSION | OTHERS |
|---|---|---|---|---|---|---|---|---|---|---|---|---|---|---|

| MAJOR CATEGORIES OF GENRES | MEDIUM CATEGORIES OF GENRES | DESCRIPTION |
|---|---|---|
| 0x0 | * | NEWS/REPORT |
| 0x0 | 0x0 | REGULAR/GENERAL |
| 0x0 | 0x1 | WEATHER |
| 0x0 | 0x2 | SPECIAL/DOCUMENTARY |
| 0x0 | 0x3 | POLITICS/DIET |
| 0x0 | 0x4 | ECONOMY/MARKET |
| 0x0 | 0x5 | FOREIGN/INTERNATIONAL |
| 0x0 | 0x6 | ANALYSIS |
| 0x0 | 0x7 | DEBATE/INTERVIEW |
| 0x0 | 0x8 | SPECIAL REPORT |
| 0x0 | 0x9 | LOCAL/COMMUNITY |
| 0x0 | 0xA | TRAFFIC |
| 0x0 | 0xB | |
| 0x0 | 0xC | |
| 0x0 | 0xD | |
| 0x0 | 0xE | |
| 0x0 | 0xF | OTHERS |
| | | |
| 0x1 | * | SPORT |
| 0x1 | 0x0 | SPORT NEWS |
| 0x1 | 0x1 | BASEBALL |
| 0x1 | 0x2 | SOCCER |
| 0x1 | 0x3 | GOLF |
| 0x1 | 0x4 | OTHER BALL SPORTS |
| 0x1 | 0x5 | SUMO/FIGHTING SPORT |
| 0x1 | 0x6 | OLYMPICS/INTERNATIONAL CONVENTION |
| 0x1 | 0x7 | MARATHON/ATHLETICS/SWIMMING |
| 0x1 | 0x8 | MOTOR SPORT |
| 0x1 | 0x9 | MARINE/WINTER SPORT |
| 0x1 | 0xA | HORSE RACE/PUBLIC RACE |
| 0x1 | 0xB | |
| 0x1 | 0xC | |
| 0x1 | 0xD | |
| 0x1 | 0xE | |
| 0x1 | 0xF | OTHERS |

FIG. 9
(A)
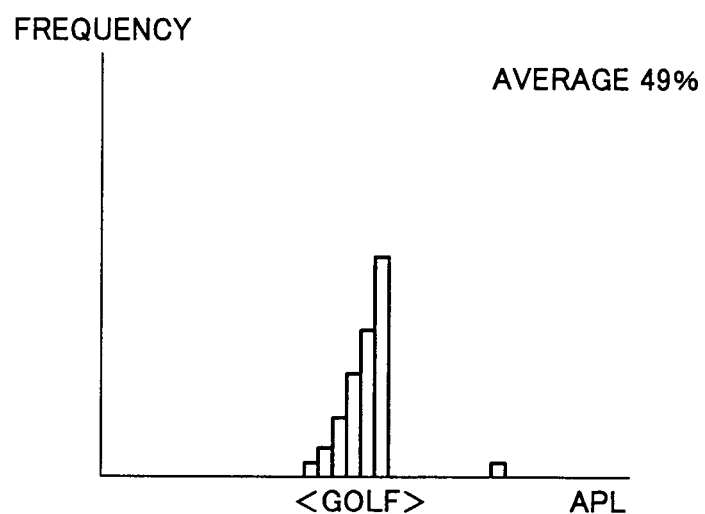
(B)
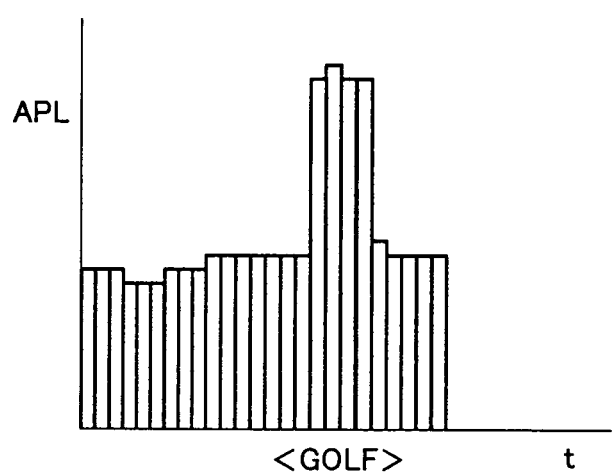

FIG. 13
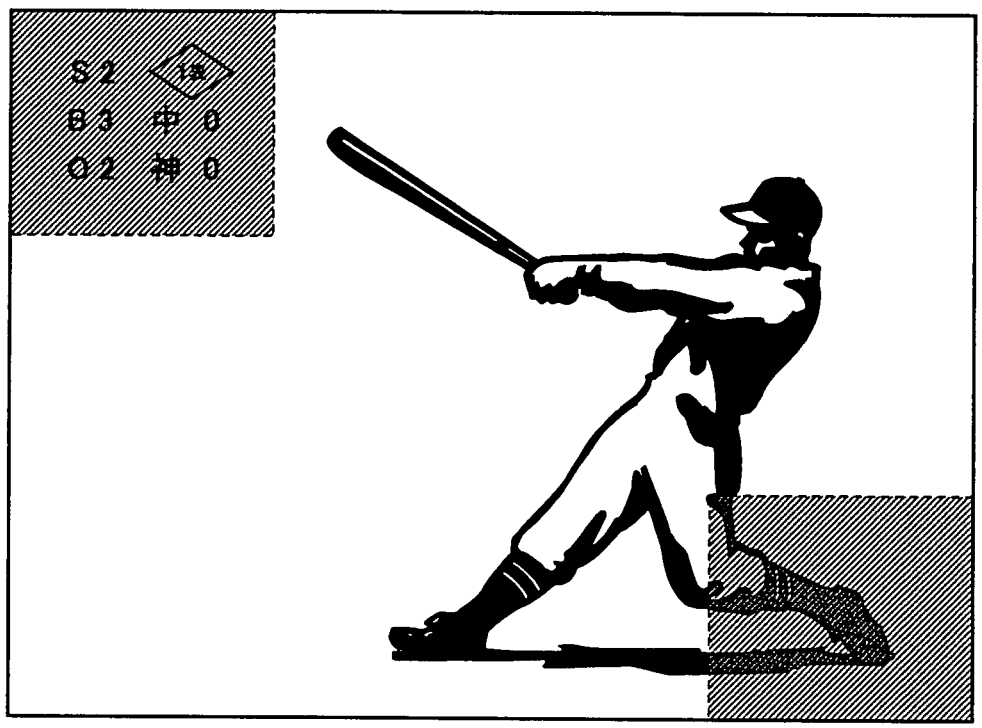
 APL NON-MEASUREMENT RANGE

LIQUID CRYSTAL DISPLAY APPARATUS

TECHNICAL FIELD

The present invention relates to a liquid crystal display apparatus, specifically relates to a liquid crystal display apparatus that controls the emission luminance of a backlight light source according to the genre of an image.

BACKGROUND OF THE INVENTION

A technique for improving the quality of a display image through control over the emission luminance of a light source according to a change in the displayed image has been suggested. The technique applies to a liquid crystal display apparatus which includes a liquid crystal panel that modulates light from a light source according to an image signal, and the light source, such as backlight, that illuminates the liquid crystal panel.

For example, a patent document 1 discloses a liquid crystal display apparatus that automatically controls contrast and backlight luminance to adjust them to displayed contents. This liquid crystal display apparatus lowers the contrast of a displayed image when the difference between the maximum luminance level and the minimum luminance level of an input image signal is large, and raises the contrast of the displayed image when the difference is small. The liquid crystal display apparatus also lowers the luminance of the backlight when the average value of the maximum luminance level and minimum luminance level of the input image signal is high, and raises the luminance of the backlight when the average value is low. Thus, the liquid crystal display apparatus always offers constant display luminance.

Besides, the liquid crystal display apparatus allows setting of any desired timer time that is a time span from a point of a change in display contents to a point of execution of control of a contrast value or a backlight luminance value. This prevents the flicker of a screen that happens when display contents is changed in a complicated manner.

A patent document 2 discloses an image display apparatus that remedies an odd feeling in a displayed image resulting from discerning of a change in the luminance of a light source when the emission luminance of the light source is controlled to remedy the deterioration of display quality due to outstanding of a black level of an image. According to this liquid crystal display apparatus, an APL detecting portion detects the APL (Average Picture Level (average luminance level)) of an input image signal to output the detected APL as an APL signal. An intermediate control signal making portion follows a change in the APL of the input image signal, making an intermediate control signal changing for each unit field period. A signal change controlling portion controls a change rate of the intermediate control signal on the basis of a preset time constant, converts the intermediate control signal into a signal having a lower change rate, and puts out the converted signal as a light source control signal.

In this manner, the image display apparatus changes the emission luminance of the light source slowly regardless of a change in the image signal. At this time, a change rate upon controlling the emission luminance of the light source to a lower direction is made higher than a change rate upon controlling the emission luminance to a higher direction. This remedies the deterioration of display quality, such as outstanding of a black tone, due to the higher emission luminance of the light source when an image scene has changed into a dark scene. Meanwhile, unnaturalness due to a change in the luminance of the light source upon a change from a dark scene to a bright scene is also suppressed to improve the quality of a displayed image as a whole.

A patent document 3 discloses a liquid crystal apparatus that remedies the deterioration of the quality of a display image due to a lack of contrast effect and outstanding of a black tone, and that improves the reliability of the apparatus as well. According to this liquid crystal apparatus, an APL detecting portion detects the APL of an input image signal for each unit field period. Based on an APL detection result, a light source control data making portion makes a light source control signal at the minimum level that allows the stable drive of the light source when the APL is from 0% to a given value A1, a light source control signal at the maximum level that allows the stable drive of the light source when the APL is from a given value A2 to 100%, and a light source control signal changing dynamically according to the APL when the APL is from the given value A1 to the given value A2.

The light source is driven based on these light source control signals so that light source control level does not follow a minute change in the APL. This is because that causing the light source control level to follow every minute change of the APL results in a disadvantage of damaging the reliability of the light source, which disadvantage is greater than an advantage of an improvement in contrast, which is not preferable.

Patent document 1: Japanese Laid-Open Patent Publication No. H05-127608

Patent document 2: Japanese Laid-Open Patent Publication No. 2002-357810

Patent document 3: Japanese Laid-Open Patent Publication No. 2003-36063

DISCLOSURE OF THE INVENTION

Problem to be Solved by the Invention

Usually, a displayed image has features that vary according to the genre of the image. For example, in the genre of movie, dark scenes appear frequently compared to other genres. In the genre of golf, images accompanying certain level of luminance, such as a scene of a lawn, appear frequently, but an abrupt change of luminance may happen in such a case as the appearance of an image of sky at tee shot play.

With regard to the case where the luminance of a light source, such as backlight, is controlled according to a change in a displayed image, the above conventional techniques provide an instance of controlling a change rate of light source luminance, such as control for slow changing of light source luminance relative to a change in a displayed image, or an instance of not allowing light source luminance to change in following a change in a displayed image when the change in the displayed image is lower than a preset level.

According to the above conventional instances, however, the follow performance of light source luminance in following a change in a displayed image is changed uniformly regardless of the genre of the displayed image. This makes impossible such elaborate control over a light source that the luminance of the light source is changed slowly following a change in a subtitle in a dark scene in a movie to suppress an unnatural change in screen luminance while the luminance of the light source is changed quickly following a sharp luminance change in a golf scene to suppress an odd feeling resulting from a change in the screen luminance.

The present invention was conceived in view of the above circumstances and it is therefore the object of the present invention to provide a liquid crystal display apparatus that has a backlight control characteristic for achieving image display of optimum quality according to the genre of an image to be displayed.

Means for Solving the Problems

In order to solve the above problems, a first technical means is a liquid crystal display apparatus comprising a liquid crystal panel that displays an image created by an input image signal, and a light source that emits light on the liquid crystal panel, the liquid crystal display apparatus controlling emission luminance of the light source on the basis of a characteristic quantity of the input image signal, wherein the liquid crystal display apparatus variably controls follow performance of the emission luminance of the light source in following a change in the characteristic quantity of the input image signal, the variable control being made according to a genre of the image displayed on the liquid crystal panel.

A second technical means is the liquid crystal display apparatus as defined in the first technical means, comprising a characteristic quantity measuring portion that measures a characteristic quantity of the input image signal, and a filter that controls a rate of change in the characteristic quantity measured at the characteristic quantity measuring portion, wherein the filter carries out weighted averaging on a characteristic quantity in past N frames (N is a natural number) including the current frame, using predetermined weighting factors, to determine an output characteristic quantity, and wherein the liquid crystal display apparatus carries out control of the emission luminance using the output characteristic quantity from the filter.

A third technical means is the liquid crystal display apparatus as defined in the second technical means, wherein a constant used for the weighted averaging is changed according to a genre of an image displayed on the liquid crystal panel.

A fourth technical means is the liquid crystal display apparatus as defined in the third technical means, having a memory means that stores the constant used for the weighted averaging in advance for each genre of an image displayed on the liquid crystal panel.

A fifth technical means is the liquid crystal display apparatus as defined in the third or fourth technical means, wherein the constant used for the weighted averaging is a constant that varies a value of the N according to a genre of an image displayed on the liquid crystal panel.

A sixth technical means is the liquid crystal display apparatus as defined in the third or fourth technical means, wherein the constant used for the weighted averaging is a constant that varies the weighting factors according to a genre of an image displayed on the liquid crystal panel.

A seventh technical means is the liquid crystal display apparatus as defined in any one of the first to sixth technical means, wherein at least an average luminance level for one frame unit of the input image signal is used as a characteristic quantity of the input image signal.

An eighth technical means is the liquid crystal display apparatus as defined in any one of the first to seventh technical means, wherein the input image signal is expanded/compressed, and the emission luminance of the light source is controlled as well.

A ninth technical means is the liquid crystal display apparatus as defined in any one of the first to seventh technical means, wherein a gradation conversion characteristic for the input image signal is altered, and the emission luminance of the light source is controlled as well.

Effect of the Invention

According to the present invention, the follow performance of the emission luminance of a light source in following a change in a characteristic quantity of an input image signal is controlled variably according to the genre of an image to be displayed. This achieves image display of optimum quality.

BRIEF DESCRIPTION OF THE DRAWINGS

FIG. 4 is a diagram of an example of genre codes that are specified according to a digital broadcasting standard.

FIG. 9 is a diagram of examples of the characteristics of APLs that result when image signals in a genre of golf have been received for a given period.

FIG. 13 is a diagram of an example of APL measurement excluding ranges.

EXPLANATIONS OF REFERENCE NUMERALS

1 . . . liquid crystal display apparatus, 11 . . . antenna, 12 . . . tuner, 13 . . . decoder, 14 . . . APL measuring portion, 15 . . . filter, 16 . . . backlight controlling portion, 17 . . . backlight unit, 18 . . . image processing portion, 19 . . . LCD controller, 20 . . . liquid crystal panel, 21 . . . microcomputer, 22 . . . table storage memory, 23 . . . luminance change table, 25 . . . remote control light-receiving portion, 27 . . . remote controller, 30 . . . case, 31 . . . fluorescent tube, 32 . . . diffusion board, 41 . . . red light source, 42 . . . green light source, 43 . . . blue light source, 51a to 51e . . . delay frame, 52a to 52d . . . weighting factor multiplier, 53 . . . adder.

PREFERRED EMBODIMENTS OF THE INVENTION

According to an embodiment of a liquid crystal display apparatus of the present invention, the average luminance level (APL: Average Picture Level) of a image signal in one frame is used as a characteristic quantity of the image signal, and the emission luminance of a backlight light source is controlled according to a change in the APL. For this control, the liquid crystal display apparatus retains a luminance change table defining a luminance change characteristic, controlling the emission luminance of the backlight light source according to the luminance control characteristic defined by the luminance change table.

The follow performance of the APL in following a change, which APL is used for controlling of the emission luminance of the backlight light source, can be set variably using a digital filter. Namely, in the use of the digital filter, the APLs of the image signal in each current frame and in one or plurality of past frames (delay frame) are used to carry out weighted average calculation on the APL using weighting each set for each frame. Through the weighted average calculation, an output APL is calculated.

The weighted average calculation with weighting each changed for each frame changes the follow performance of the APL in following the image signal in the time axis direction, and the emission luminance of the backlight light source is controlled according to the output APL with the changed follow performance. This means that changing the weighting properly allows variable setting of the follow performance of emission luminance control on the backlight light source in following a change in the characteristic quantity of the input image signal in the time axis direction.

The follow performance of the emission luminance of the backlight light source in following a change in the APL is set for each image genre. This allows optimum emission luminance control on the backlight light source according to image characteristics specific to each genre. Thus, image display with improved quality can be carried out without giving a viewer an odd feeling.

Figure 1:
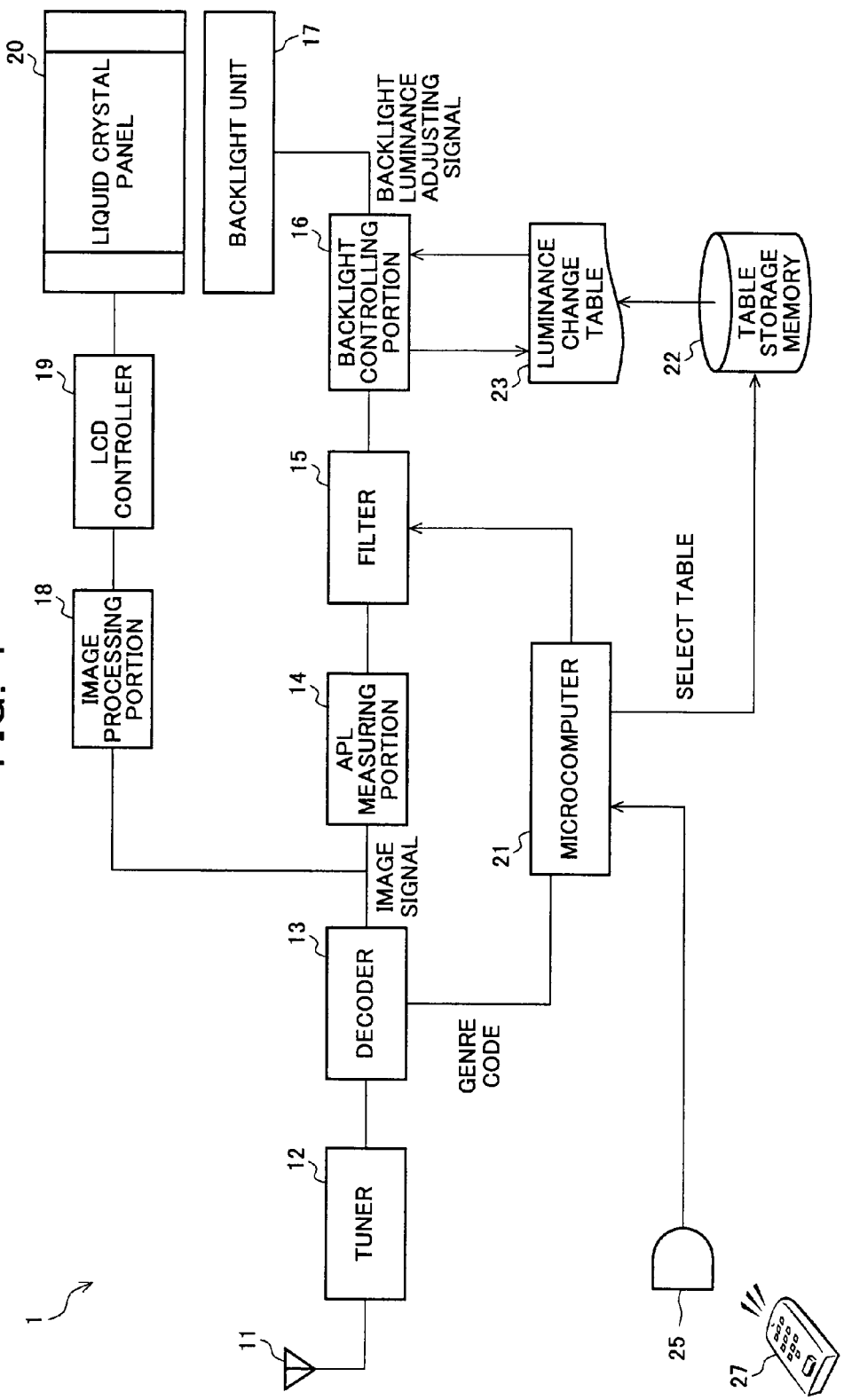
FIG. 1 is a block diagram for explaining the configuration of a liquid crystal display apparatus in an embodiment according to the present invention.

FIG. 1 is a block diagram for explaining the configuration of a liquid crystal display apparatus in an embodiment according to the present invention. In the liquid crystal display apparatus 1, a tuner 12 tunes a broadcast signal received by an antenna 11 to a selected channel. A decoder 13 decodes the broadcast signal tuned at the tuner 12 to divide the broadcast signal in a multiplexing process, thus outputting an image signal for driving a crystal panel 20 and genre information, which are contained in electronic program information, etc., of the broadcast signal.

The image signal divided at the decoder 13 is subjected to various image processes at an image processing portion 18, and then is put into an LCD controller 19 that drives and controls the crystal panel 20. Based on the input image signal, the LCD controller 19 outputs a liquid crystal driving signal to a gate driver and a source driver (both drivers are not shown) of the crystal panel 20, which then displays an image following the image signal.

The image signal divided at the decoder 13 is output also to an APL measuring portion 14, which measures the APL of the image signal put out of the decoder 13 for each one frame. The measured APL is sent to a filter 15. The APL is one of image characteristic quantities according to the present invention. Emission luminance control on a backlight light source according to the APL is carried out on the basis of a luminance change characteristic given by a luminance change table, which will be described later.

According to the example shown in FIG. 1, the APL is measured on the image signal just after the decoding process of the image signal at the decoder 13. The APL, however, may be measured after the image signal has undergone the image processes by the image processing portion 18. The image processing portion 18, however, may execute such processes as OSD (On-Screen Display), scaling, and letter box display (limitation on an image area by a black mask, etc.). In this case, measuring the APL on the image signal just put out of the decoder 13 (i.e., the image signal not subjected yet to the image processes by the image processing portion 18) allows control of the emission luminance of the backlight light source corresponding to the genuine image signal free from the effect of these image processes. APL measurement on the image signal before the image processes, therefore, is preferable, as depicted in the example of FIG. 1.

The filter 15 sets the follow performance of the image signal in following an APL change upon controlling backlight luminance according to a measurement value of the APL. For example, the filter 15 is composed of a multistage digital filter. A specific exemplary configuration of the filter 15 and an example of setting the filter 15 corresponding to the genre of a displayed image will be described later.

The APL put out of the filter 15 is put into a backlight controlling portion 16. Based on a luminance change table 23 selected from a table storage memory 22, the backlight controlling portion 16 puts out a backlight luminance adjusting signal for adjusting backlight luminance corresponding to the APL input to the backlight controlling portion 16. A backlight unit 17 then controls the emission luminance of the backlight light source according to the backlight luminance adjusting signal put out of the backlight controlling portion 16.

Figure 2:
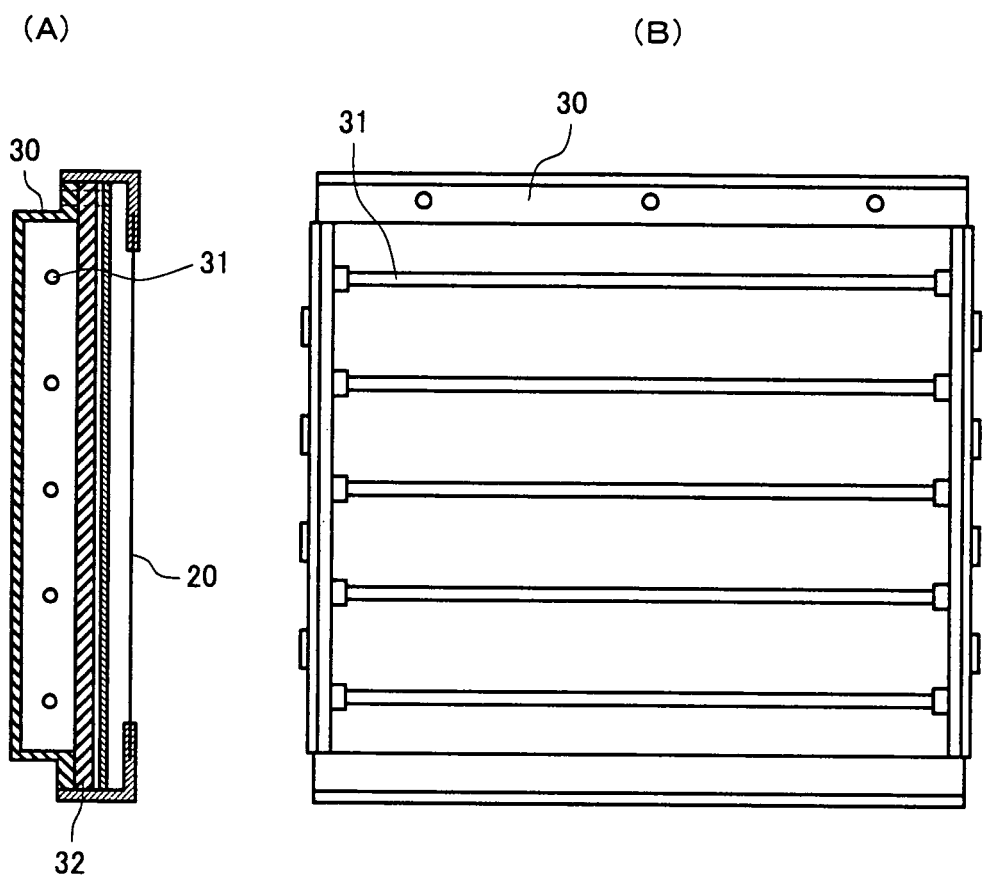
FIG. 2 is a diagram of an exemplary configuration of a backlight unit that can apply to the liquid crystal display apparatus of the present invention.

The backlight unit 17 is, for example, constructed by arranging a plurality of capillary-shaped fluorescent tubes 31 at equal intervals in a case 30 attached to the back of the liquid crystal panel 20, as shown in FIG. 2. A diffusion board 32 uniformly diffuses illuminating light emitted from the fluorescent tubes 31.

In this case, for example, the backlight unit 17 includes a light adjusting control circuit (not shown) that outputs pulse width modulation output, in which the signal period ratio (duty) of a square wave between a high-voltage level and a low-voltage level changes as a light adjusting signal, according to the backlight luminance adjusting signal input from the backlight controlling portion 16, and an inverter (not shown) that receives the light adjusting signal from the light adjusting control circuit to generate an AC voltage having a cycle and a voltage corresponding to the light adjusting signal and that applies the generated AC voltage to the fluorescent tubes 31 to turn on the fluorescent tubes 31. The inverter operates when the output from the light adjusting control circuit is at the high-voltage level, and stops operating when the output is at the low-voltage level, thus operates intermittently according to output duty from the light adjusting control circuit to adjust the luminance of the light source.

Figure 3:
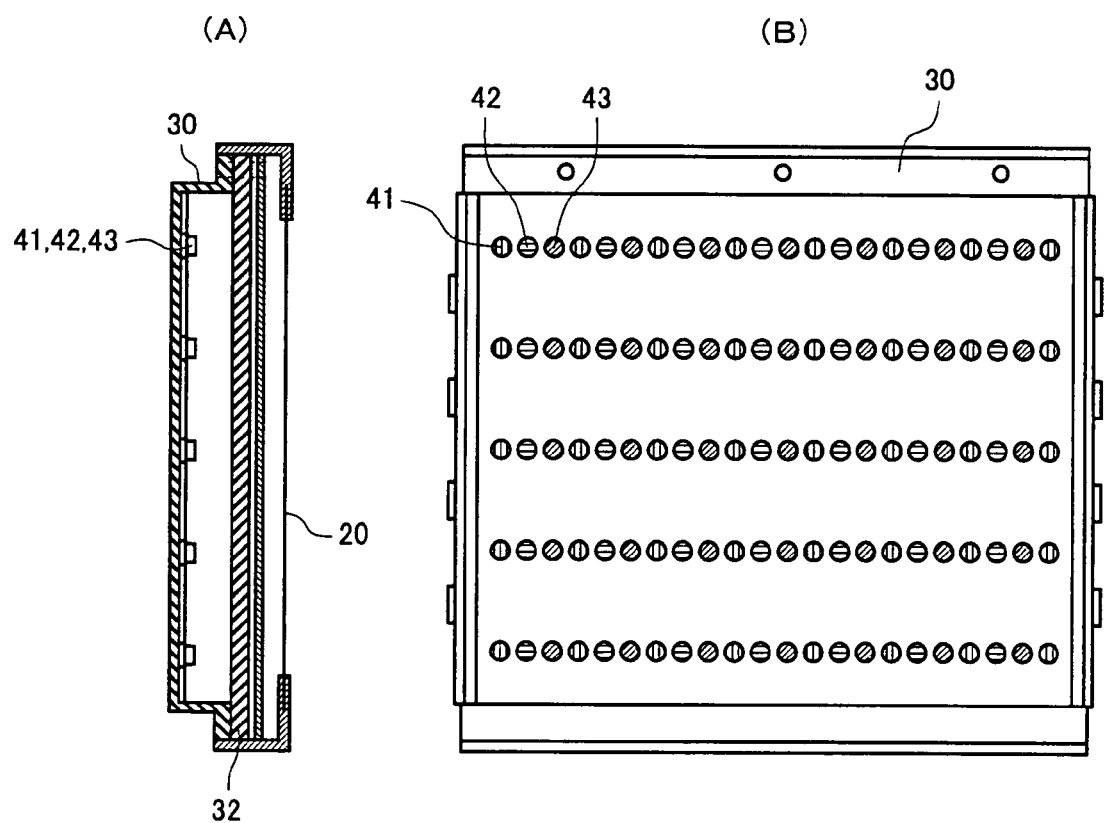
FIG. 3 is a diagram of another exemplary configuration of the backlight unit that can apply to the liquid crystal display apparatus of the present invention.

The backlight unit 17 may be constructed by arranging LED light sources of a plurality of colors consisting of three primary colors of red, green and blue, that is, red light sources 41, green light sources 42, and blue light sources 43, in the case 30 attached to the back of the liquid crystal panel 20, as shown in FIG. 3. The emission luminance of the LED light sources can be controlled through an LED current supplied to each LED light source.

A unit combining the above fluorescent tubes and the LEDs, which unit is not shown, may be employed as the backlight unit 17. The backlight unit 17 may be given a structure called side edge type to illuminate the liquid crystal panel 20. The side edge type structure brings light from such light source as fluorescent tubes and LEDs into uniform against a plane, using a light guide plate.

The liquid crystal display apparatus 1 has a remote control light-receiving portion 25 that receives remote control signal transmitted from a remote controller 27. The remote control light-receiving portion 25 is, for example, composed of light-receiving LEDs that receive a remote control operation signal made of infrared.

The remote control operation signal received by the remote control light-receiving portion 25 is put into a microcomputer 21, which executes prescribed control according to the input remote control operation signal.

Genre information on a broadcasting program is, for example, contained as a genre code in a part of electronic program information (hereinafter "EPG information"), which is overlapped with and transmitted by a broadcast signal of the ground digital broadcasting, BS digital broadcasting, or CS digital broadcasting.

The broadcast signal is received by the tuner 12 and is executed the decoding process by the decoder 13, as described above. The genre code is put out of the broadcast signal as the genre information divided from the broadcast signal trough the multiplexing process. Obtaining/dividing the genre information from the broadcast signal tuned to the selected channel by the tuner 12 is not the only way to obtain/divide genre information. For example, genre information can be obtained in such a way that a flag indicating a genre (e.g., identification code indicating "movie"), which is added to such a media medium as DVD, is detected when an external device, such as DVD player and blue ray disc player, is connected to the liquid crystal display apparatus 1 and image information played back by the external device is displayed on the liquid crystal display apparatus 1.

The broadcast signal is not limited to a digital broadcast signal, but may be an analog broadcast signal from which genre information can also be obtained. For example, ADAMS-EPG (TV-Asahi Information and MultiMedia Service Electronic Program Guide) is EPG information overlapped with and transmitted by an analog broadcast signal.

In addition to a case of simultaneous input of genre information and an input image signal, the genre information may be put into the liquid crystal display apparatus 1 as sub-information separated from the image signal. In such a case, where the image signal and genre information are input separately, the genre information is the input that is linked to the image signal to provide information of image information indicated by the genre information. For example, XMLTV is an application that automatically obtains a TV program table published on Web and outputs in XML, and this can be used for obtaining the genre information of an image displayed from network.

Genre codes provided as genre information are, for example, specified according to the ground digital broadcasting standard, as shown in FIG. 4. The example shown in FIG. 4 exhibits genres classified into major categories, which include "news/report", "sport", "information/tabloid show", "drama", "music", "variety", "movie", "cartoon/special effects", "documentary/culture", "stage/performance", "hobby/education", and "others".

Each major category includes a plurality of middle categories. For example, the major category of "sport" includes middle categories of "sport news", "baseball", "soccer", "golf", "other ball sports", "Sump/fighting sport", "Olympics/international convention", "marathon/athletics/swimming", "motor sport", "marine/winter sport", "horse race/public race", and "others".

According to the embodiment of the liquid crystal display apparatus of the present invention, the follow performance of emission luminance control on a backlight light source in following a characteristic quantity of an image signal is set according to a genre when the emission luminance of the backlight light source is controlled according to the APL of the image signal measured at the APL measuring portion 14. This allows a viewer to view a displayed image without having an odd feeling.

Specifically, the APL of the image signal measured at the APL measuring portion 14 is put into the filter 15, and a rate of change of the APL along the time axis is controlled to control the follow performance of emission luminance control on the backlight light source. At this time, a genre corresponding to an image to be displayed is determined, and a constant used for weighted averaging on the filter 15 is changed according to the determined genre. This enables execution of the emission luminance control on backlight light source that optimizes display quality for each genre.

Figure 5:
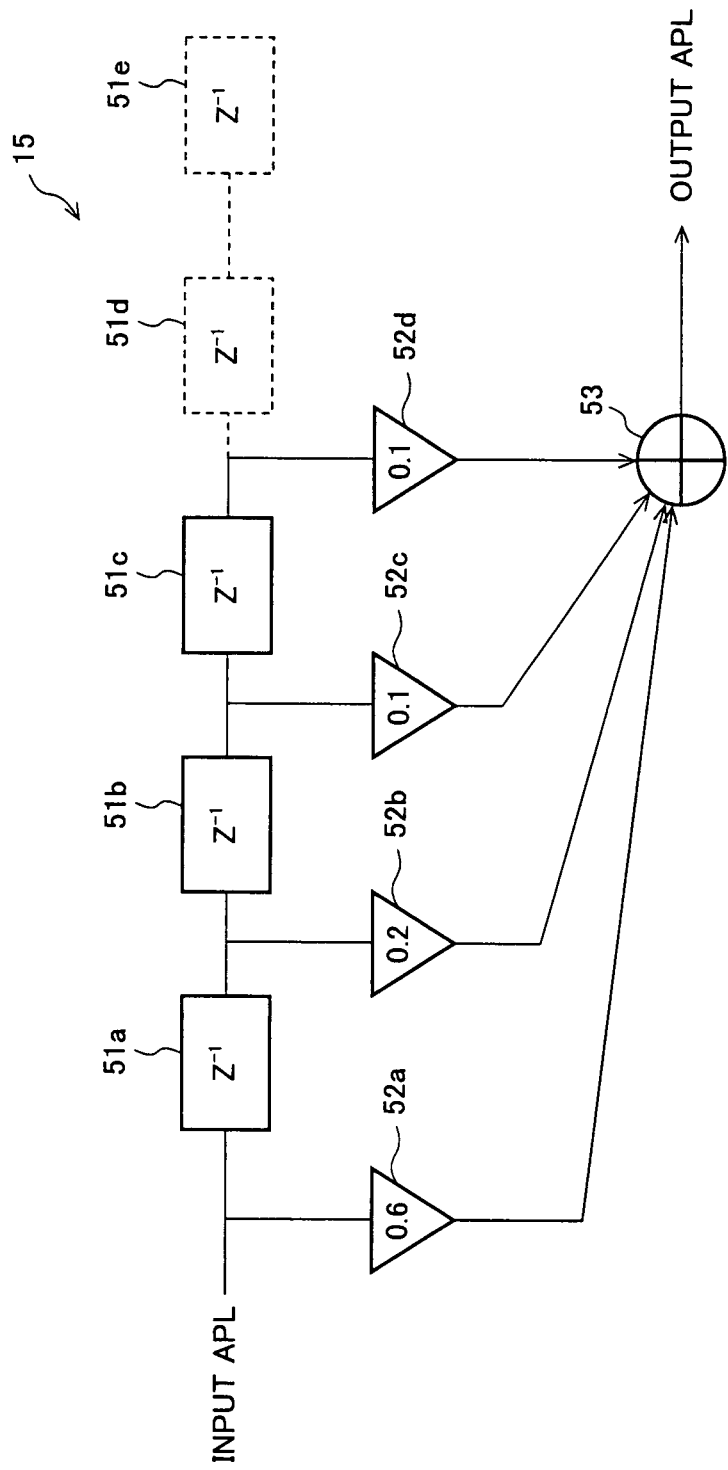
FIG. 5 is a diagram for explaining an exemplary configuration of a digital filter that can apply to the liquid crystal display apparatus of the present invention.

FIG. 5 is a diagram for explaining an exemplary configuration of a digital filter that can apply to the liquid crystal display apparatus of the present invention. The digital filter as shown in FIG. 5 can be used as the filter 15 shown in FIG. 1. Referring to FIG. 5, 51a to 51e each denote a delay frame, 52a to 52d each denote a weighting factor multiplier, and 53 denotes an adder.

As described above, an APL for each frame is put out of the APL measuring portion 14 into the filter 15. Then, weighted average calculation is carried out on the input APL with each factor of weighting applied to each of the current frame and one or a plurality of frames in the past (delay frame), thereby an output APL is calculated. The filter 15, therefore, carries out weighted average calculation on the APL in the current frame and past N frames (N is a natural number), using the preset weighting factors, to determine the output APL, and controls the emission luminance of the backlight light source using the output APL.

The value of N, which is the number of stages of the past frames (number of stages of the delay frames) reflected on the current frame, can be set variably, and each weighting is set for each of the current frame and the past N frames (frames numbering in the set number of stages). The APL in the current frame and in the delay frames numbering in the number of stages to be used is subjected to weighted average calculation according to each weighting set for each frame to determine the output APL. The number of stages of the delay frames and the weighting factors are an instance of a constant used for weighted averaging on the filter 15. Either or both of the number of stages of delay frames and the weighting factors are set to carry out the above process.

According to the example shown in FIG. 5, the number of stages of delay frames is determined to be three, and the APLs in the current frame and in three delay frames are calculated according to each weighting factor set for each frame to determine the output APL. In this case, the weighting factor for the current frame is determined to be 0.6, and the weighting factors for the delay frames are determined to be 0.2, 0.1, and 0.1, respectively. The APL in each frame is multiplied by each weighting factor corresponding to each frame, and the sum of the weighted APLs in the four frames is taken to be the output APL. In this case, the weighting is set as factors the sum of which amounts to 1. Because of this, the weighted average of the input APL is given by determining the sum of the weighted APLs multiplied by the factors.

In the above configuration, the number of stages and weighting for the filter 15 are set variably in a proper manner according to the genre of a displayed image. This enables varying of the follow performance of the output APL in following an actual change in the APL, and also enables setting on turning on and off of a filter function.

The above digital filter may be provided as a feedback-type filter that feeds back each APL value for each delay frame determined by weighted multiplication into each delay frame to form a loop process. This allows control for further lowering the follow performance of the output APL in following a change in the APL.

Figure 6:
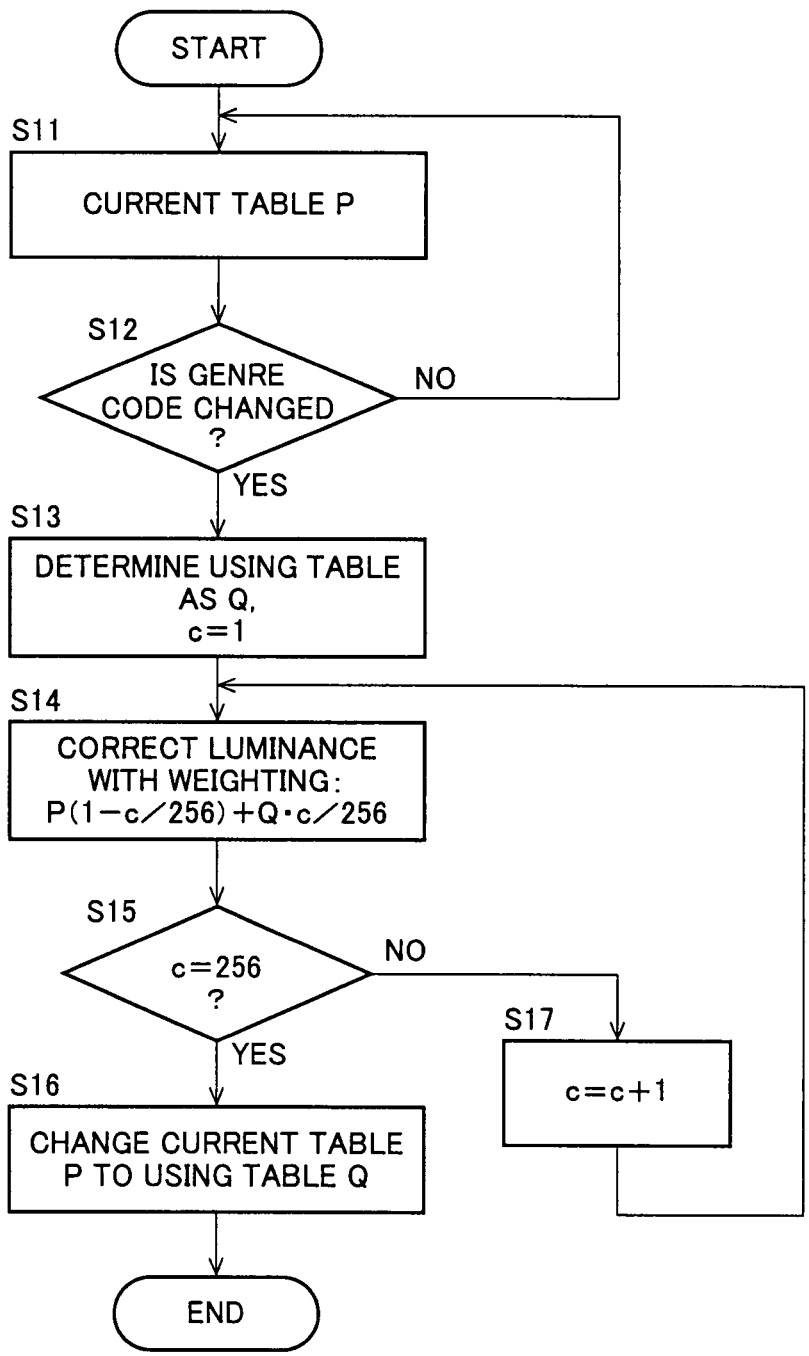
FIG. 6 is a flowchart of an operation of gradual transition to a luminance control characteristic defined in a table used after a change in a table number, which transition is made through given times of change of luminance carried out upon changing the table number.

An example of a change in a table number will be described referring to FIG. 6. FIG. 6 is a flowchart of an operation of gradual transition to a luminance control characteristic defined in a table represented by a changed table number, which transition is made through a given times of change of luminance carried out upon changing the table number. Operation of changing a luminance control characteristic using 256 frames will be described, referring to FIG. 6.

When a table number referred to at the present is P (S11) and a change in a genre code is detected (S12), the number of a using table corresponding to a changed genre code is determined in response to the detection (in this example, the number of the table is determined to be Q). At the same time, the number of times of change c is set to 1 (S13). Then, changed luminance is determined by weighting the current table P and the determined using tabled Q in calculation according to the following equation (1), thus the present luminance is corrected (S14).

$$\text{Altered luminance } P'=P(1-c/256)+Q\cdot c/256 \tag{1}$$

Subsequently, whether c=256 is satisfied (whether the luminance has been corrected 256 times, which is the preset number of times) is checked (S15). If the number of times of change does not reach the preset number of times, the count value c is increased by 1 (S17), and the present luminance is corrected into P' according to the above equation (1). A cycle of operation from S14 to S15 to S17 is repeated in a given number of times. When alteration is made 256 times, which is the preset number of times, the current table P is changed finally into the using table Q(S16). The above instance represents a case where the luminance table is corrected gradually using 256 frames. The alteration using 256 frames is, however, not the only option. When a genre code is changed, the preset number of times may be set variably to vary a change time (follow performance) for an emission luminance control characteristic on the backlight light source.

According to the present embodiment, as described above, the emission luminance control of the backlight light source is executed corresponding to the APL of an input image signal, at which the APL used for the control is controlled through weighted averaging on the filter 15 according to the weighting. For each genre of a displayed image, a constant used for the weighted averaging on the filter 15 can be set individually. The constant (weighting factors and the number of stages of delay frames to be used) is, for example, stored and retained in a memory means not shown, such as ROM and RAM, to which the microcomputer 21 can make access. The microcomputer 21 extracts the constant stored in the memory means on the basis of obtained genre information of the image to set the constant on the filter 15.

Control of the emission luminance of the backlight light source is based on the luminance change table 23 selected from the table storage memory 22, being carried out by outputting a backlight luminance adjusting signal for adjusting backlight luminance according to the APL of the image signal.

Figure 7:
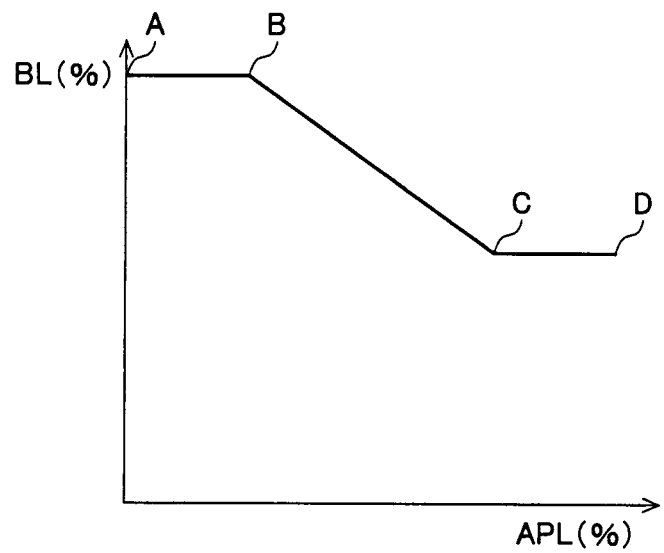
FIG. 7 is a diagram for explaining an example of a luminance change characteristic used for controlling the emission luminance of a backlight light source.

An example of setting of a luminance change characteristic of the backlight controlled by a luminance change table will be described. FIG. 7 is a diagram for explaining an example of a luminance change characteristic used for controlling the emission luminance of the backlight light source. To say the obvious, the luminance change characteristic according to the present invention is not limited to this example of the luminance change characteristic. APL is represented by percentage. When the entire part of a displayed image is black, therefore, APL is 0%, and when the entire part of the displayed image is white, which means APL is at maximum value, APL is 100%.

In FIG. 7, the horizontal axis represents an APL (%) measured at the APL measuring portion. The vertical axis shown in FIG. 7 represents the emission luminance of the backlight light source expressed in percentage, indicating 100% when the backlight luminance is at maximum, and indicating 0% when the backlight is tuned off. According to the example shown in FIG. 7, the control characteristic of the backlight is changed according to an area where the APL is low, which area is given as an A-B section, to an area where the APL is at middle level, which area given as a B-C section, and to an area where the APL is high, which area is given as a C-D section.

For example, in the area where the APL of an input image signal is low (A-B section), the emission luminance of the backlight light source is set to a specific value at high level. The area of low APL means a dark image, which produces less such effect as dazzling on the screen and stimulus to the eyes. In the area of low APL, however, the emission luminance of the backlight light source is set at high level so that peak spots in the dark image stand out and gradation expression is improved.

In the area where the APL of the input image signal is high (C-D section), the emission luminance of the backlight light source is set to a specific value at low level so that such effects as dazzling on the screen and stimulus to the eyes are reduced to the minimum.

In the area where the APL of the input image signal is approximately at middle level (B-C section), the emission luminance of the backlight light source is so controlled that the emission luminance decreases in response to an increase in the APL in a correlation defined by a given level of gradient.

Figure 8:
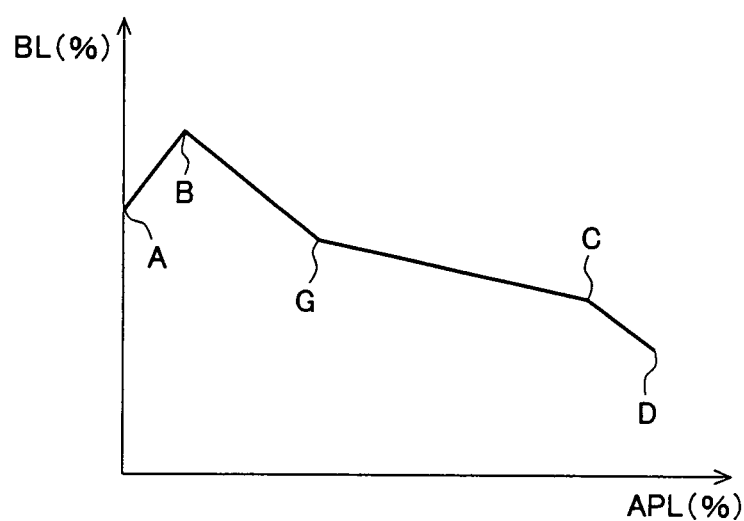
FIG. 8 is a diagram for explaining another example of a luminance change characteristic used for controlling the emission luminance of the backlight light source.

FIG. 8 is a diagram for explaining another example of control of the emission luminance of the backlight light source using a luminance control table, depicting another example of a pattern of a luminance control characteristic that can apply to the present embodiment.

According to the example shown in FIG. 8, the control characteristic of the backlight light source is changed corresponding to an area where the APL is low, which area is given as an A-B section (first APL area), to an area where the APL is at middle level, which area given as a B-C section (second APL area), and to an area where the APL is high, which area is given as a C-D section (third APL area). In the second APL area, where the APL is at the middle level, a characteristic change point G is formed, at which the gradient of the luminance control characteristic is changed.

The luminance control characteristic shown in FIG. 8 is set for the purpose of further reducing power consumption by the backlight light source while maintaining the quality of a displayed image. On the luminance control characteristic shown in FIG. 8, a characteristic change point B present at the lowest side with regard to the APL is set at the point where the APL is 10%, and a characteristic change point C present at the highest side with regard to the APL is set at the point where the APL is 90%. The characteristic change point B at the lowest side with regard to the APL is the characteristic change point at which the emission luminance of the backlight reaches the maximum.

95% or more of image signals for broadcasting belong to a signal area where the APL stands at 10% to 90%. In this signal area, in the same manner as the above conventional techniques, the light source emission luminance is raised at a lower APL value (close to 10%) to improve a contrast effect, and is lowered at a higher APL value (close to 90%) to reduce unnecessary dazzling effect.

Specifically, in the signal area (area B-C) where the APL is 10% to 90%, the emission luminance of the backlight light source is decreased as the APL increases. In addition, the characteristic change point G is set in this area to change a rate of change of the emission luminance.

In a signal area (area A-B) where the APL is extremely low to stand at 0% to 10%, the emission luminance is decreased from the characteristic change point B, at which the emission luminance of the backlight light source is at maximum, as the APL decreases.

In the signal area (area C-D) where the APL is extremely high to stand at 90% to 100%, the emission luminance of the backlight light source is decreased as the APL increases further.

In the signal area where the APL is extremely high to stand at 90% to 100%, the image signal itself carries sufficient luminance, so that increasing the luminance of the backlight light source is meaningless. Increased luminance, on the contrary, causes the viewer to feel a dazzle on the screen, thus might give a bad effect to the viewer's eyes. In this signal area, therefore, a rate of change of the emission luminance of the backlight light source to a rate of change of the APL is determined to be larger than a rate of change of the emission luminance to a rate of change of the APL in the signal area where the APL is 10% to 90%, and the emission luminance of the backlight light source is decreased further.

With regard to the above luminance control characteristic, for example, a CRT (Cathode-Ray Tube), which is a typical display means, has a characteristic that when an APL exceeds 50% level, the luminance of the screen decreases with increasing APL.

According to the luminance control characteristic, the emission luminance of the backlight light source is caused to decrease in response to an increase in the APL in the signal area of high APL (area C-D), where the luminance control characteristic is, therefore, in pursuant to the luminance characteristic of the CRT. This eliminates an odd feeling in viewing and image quality deterioration.

In the above manner, the emission luminance of the backlight light source is controlled corresponding to the APL of the image signal, using the luminance change table.

A specific example of backlight control corresponding to the genre of an image will then be described.

As described above, according to the present embodiment, the follow performance of emission luminance control on the backlight light source in following a characteristic quantity of an input image signal is set corresponding to a genre. For example, for a sport program, a punch and sensation of speed created by the image of the program are emphasized. To that end, the follow performance of emission luminance control on the backlight light source is raised to cause the emission luminance to quickly follow a change in an APL. In this case, the value of the number of past frames N used for weighted average calculation by the filter 15 is reduced, or a larger weighting factor is set for a frame closer to the current frame, or both processes are carried out.

For a movie program, the follow performance of emission luminance control on the backlight light source is lowered to cause the emission luminance to slowly follow a change in an APL. This control is made to suppress the unnaturalness of a displayed image and the viewer's eyestrain due to an excessive change in backlight luminance and reduce an odd feeling due to a change in subtitle luminance. In this case, the value of the number of the past frames N used for weighted average calculation by the filter 15 is increased, or a smaller weighting factor is set for a frame closer to the current frame, or both processes are carried out.

In this manner, a constant (weighting factor and the number of past frames N to be used) for the filter 15 is set corresponding to the genre of a displayed image to achieve the optimum emission luminance control on the backlight light source, which emission luminance control is adapted to image characteristics specific to a contents type (genre).

FIG. 9 is a diagram of examples of the characteristics of APLs that result when image signals in a genre of golf have been received for a given period. FIG. 9(A) is a histogram of the frequency (time) of the APL, and FIG. 9(B) is a histogram of a change in the APL in the time axis direction. The genre of golf is classified into "sport" in the major categories, and into "golf" in the middle categories in classification by the genre codes shown in FIG. 4.

A golf program classified into the genre of golf gives an average APL of 49%, but the APL of the program changes abruptly, for example, when an image of the tee ground changes into an image of sky at tee shot play.

In controlling the image signal of such a golf program, larger weighting for delay frames in the filter 15 slows down the follow performance of the image signal in following the APL. This causes the luminance of the screen displaying a scene of sky to change gradually, for example, when the APL changes abruptly as a result of the change from the tee shot image to the sky image. As a result, the viewer comes to have an odd feeling.

In controlling the image signal in the genre of golf, therefore, backlight luminance is caused to quickly follow a change in the APL of the image signal so that the viewer does not get an odd feeling upon an abrupt APL change.

Figure 10:
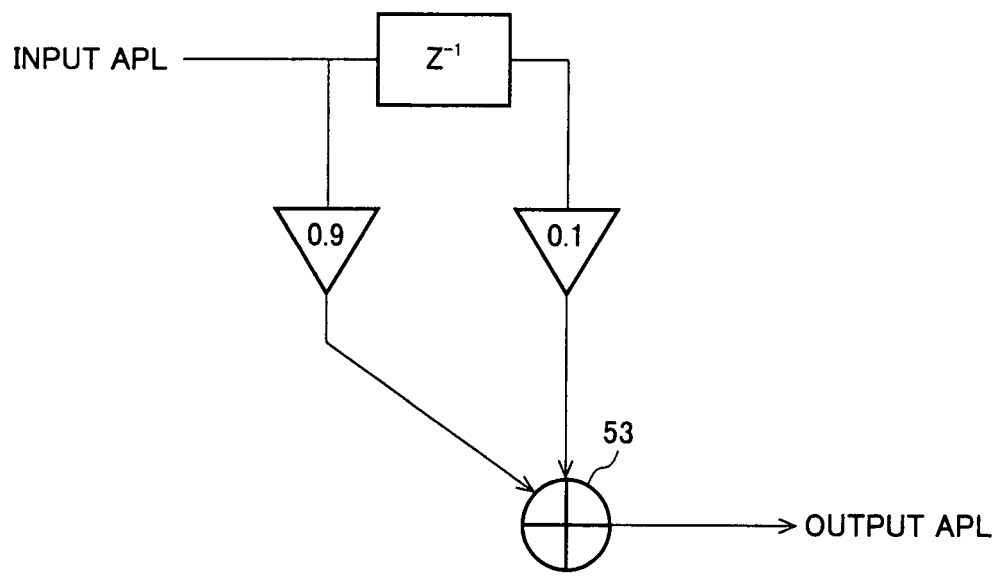
FIG. 10 is a diagram of an example of setting of a filter 15, which setting is made for the genre of golf.

FIG. 10 is an example of setting of the filter 15, which setting is made for the genre of golf. As shown in FIG. 10, the number of stage to be used in a delay frame is determined to be one (APL in only one frame in the past is used) in the case of the genre of golf. In this case, a weighting factor for the APL in the current frame is determined to be 0.9, and the same for the APL in the first delay frame is determined to be 0.1.

This weighting factor setting allows the viewer to view the image without an odd feeling even if an abrupt change in the APL of the image signal occurs.

Figure 11:
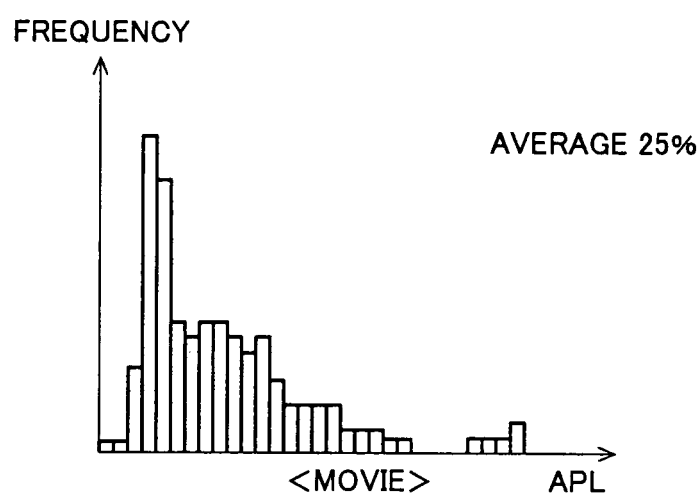
FIG. 11 is a diagram of an example of the APL characteristic of an image signal in the genre of movie.

FIG. 11 is a diagram of an example of the APL characteristic of an image signal in the genre of movie. The genre of movie is classified into "movie" in the major categories in classification by the genre codes shown in FIG. 4.

In many cases, image contents in the genre of movie are a dark image showing an overall low APL. The dark image in this genre, however, includes a scene showing a high APL, such as a scene of explosion.

In the case of the genre of movie, when the follow performance of the image signal in following a change is set high, for example, the luminance of a subtitle changes conspicuously to give an odd feeling to a viewer in contrary to the above case of golf. In the case of the genre of movie, therefore, the usage number of stages of delay frames and weighting factors are set relatively greater to slow down the follow performance of the light source emission luminance in following a change in a characteristic quantity of the image signal, thus eliminate the odd feeling of the viewer.

As described above, optimum luminance control on the backlight light source, which luminance control is adapted to the image characteristics of each genre, can be achieved for each genre.

Figure 12:
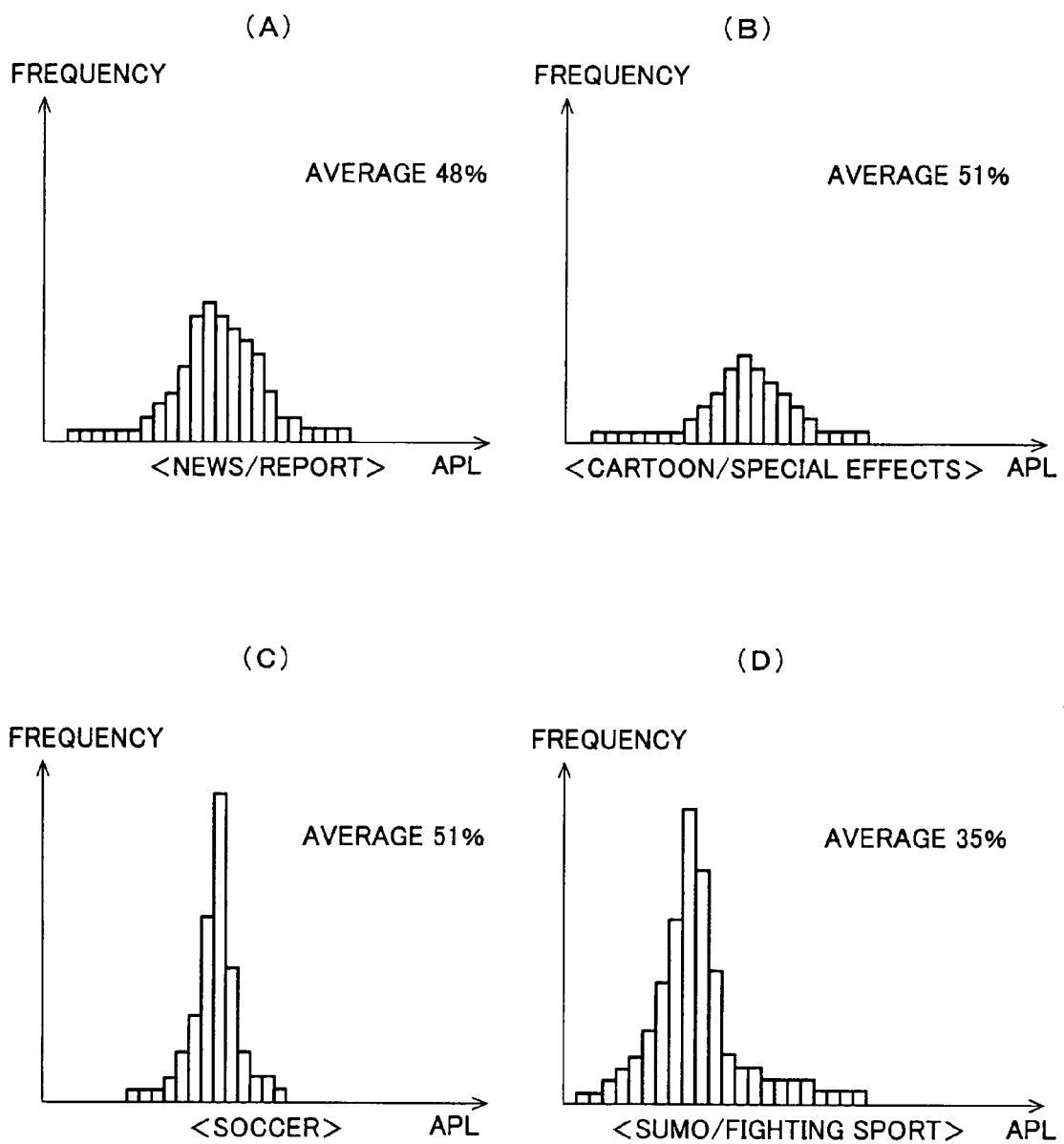
FIG. 12 a diagram of the characteristics of APLs of image signals in other genres.

FIG. 12 is a diagram of the characteristics of APLs of image signals in other genres. FIG. 12(A) is a diagram of an image signal that is classified into "news/report" in the major categories in classification by the genre codes, FIG. 12(B) is a diagram of an image signal that is classified into "cartoon/special effects" in the major categories in classification by the genre codes, FIG. 12(C) is a diagram of an image signal that is classified into "sport" in the major categories, and into "soccer" in the middle categories in classification by the image genre codes, and FIG. 12(D) is a diagram of an image signal that is classified into "sport" in the major categories, and into "sumo/fighting sport" in the middle categories in classification by the image genre codes.

As shown in FIG. 12, the APL characteristic of each image signal has a feature corresponding to the genre of each image signal, so that the follow performance to be set on the filter 15 (such constant as weighting factors and the usage number of stages of delay frames) can be set properly corresponding to the genre of the image signal. This allows the user to view an image in any genre without an odd feeling, thus offers liquid crystal display with improved quality.

In addition, such a luminance change characteristic as shown in FIG. 7 is set separately for each image genre in an optimum manner, and is combined with the above optimum setting of a filter characteristic to achieve optimum display quality and lower power consumption.

With respect to such separate control of the luminance change characteristic for each genre as described above, "major category" and "middle category" only are specified as genre code classification under the present digital broadcasting standard. An alteration in the standard and version updating in the future, however, brings an expectation of a standard to be specified for small categories. In such a case, more elaborate and proper image display can be carried out through control of the emission luminance of the light source corresponding to given conditions specific to each small category.

Control of the emission luminance of the light source corresponding to genre information as described above is not always possible, and the genre information may not be obtained in a certain case. Besides, when the major category of a genre code is "others", the genre information is virtually unobtainable in actual meaning. In such a case, the genre of an image the user viewed frequently in the past is assumed to be the genre of the image to be displayed, referring to a view history of the user, and an APL for controlling the emission luminance of the backlight light source is obtained using a filter constant corresponding to the assumed genre.

In the above examples, an APL is used as an image characteristic quantity of an input image signal to control the follow performance of the filter 15 corresponding to the APL. The image characteristic quantity is not limited to the APL, but, for example, the state of luminance peaks (presence/absence or many/few) in one frame of the input image signal may be used as the image characteristic quantity.

In other cases, the maximum luminance level or minimum luminance level or a luminance distribution condition (histogram) in a given area (period) in one frame may be used as the image characteristic quantity of the input image signal, or an image characteristic quantity determined by combining the above luminance levels and distribution condition is used as the image characteristic quantity on the basis of which the emission luminance of the backlight light source is controlled variably.

When an APL is used, the average value of the luminance levels of all image signals in one frame does not need to be determined for determining the APL. For example, the average value of the luminance levels of image signals near the center of a display image other than the ends of the display image is determined, and the determined average value is used as an image characteristic quantity. For example, based on genre information separated and obtained from a broadcasting reception signal, a preset image area (where characters and symbols are probably overlapped) is excluded through gate control to measure an image characteristic quantity of a given partial area. FIG. 13 depicts a conception of APL measurement excluding areas of an image in a case where the genre of an image is classified into "baseball" in the middle categories. In FIG. 13, the excluding areas may be expanded to all four corners including the upper light and lower left corners.

While a constant to be set on the filter 15 is changed automatically corresponding to genre information, a user may be allowed to select the above constant from a menu setting screen using a remote controller, etc. Such a configuration allows the user to use a luminance change characteristic with follow performance desirable to the user, thus improves usability.

The luminance change control as described above can apply not only to a direct view type of liquid crystal display apparatus having the backlight unit 17, as shown in FIG. 2 or 3, but also to a projection-type display apparatus, such as liquid crystal projector. In the case of the projection-type display apparatus, source light is emitted from the back of a liquid crystal panel to make image display, as in the case of the direct view liquid crystal display apparatus, and the emission luminance of the source light is controlled through the above luminance change characteristic.

Second Embodiment

A second embodiment according to the present invention will then be described. The description of the first embodiment relates to the display apparatus that merely carries out control of reducing the emission luminance of a light source as the APL of an input image signal gets larger. The description of the second embodiment, on the other hand, relates to an additional image signal process that can be combined with light source control.

Figure 14:
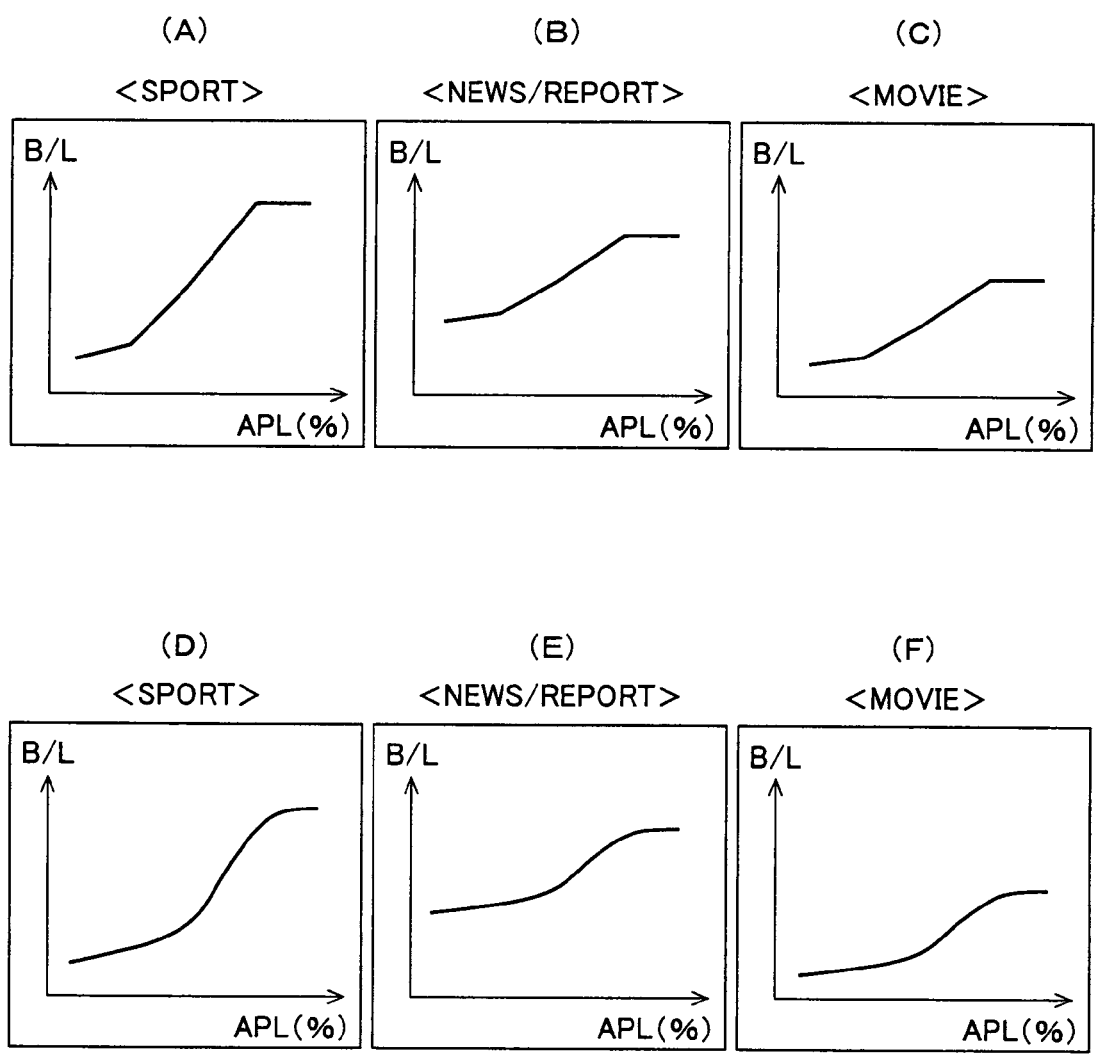
FIG. 14 is a diagram of examples of luminance change tables that are used upon carrying out image display through execution of control over the emission luminance of a light source and also of the expansion/compression of an image signal.

FIG. 14 depicts examples of luminance control tables for respective genres (major categories) according to the present invention. The luminance change characteristic according to the second embodiment, which is different from luminance change characteristic according to the first embodiment, is the characteristic that raises the emission luminance of a light source as an APL, which is an image characteristic quantity of an input image signal, gets larger. This luminance change characteristic is used to process an image with a low APL, which is regarded as a dark image as a whole, in such a way that light source luminance is lowered while an image signal level is expanded to enlarge a dynamic range so that a black level is suppressed sufficiently to improve a contrast effect. In the same manner, the luminance change characteristic is used to process an image with a high APL in such a way that an image signal level is compressed while the emission luminance of the light source is raised so that the occurrence of contrast-flattening by whitening is suppressed.

As described above, the present invention can apply to a display apparatus that improves a contrast effect of a display image by executing emission luminance control on the light source according to a characteristic quantity of an input image signal and also executing an expansion/compression process on the image signal. In this case, optimum light source control is carried out for each contents type, as in the above case, to be able to maintain the contrast effect while reducing power consumption.

In the above embodiments, proper control of the emission luminance of the light source may be combined with an additional process of gradation conversion characteristic alteration, such as gamma correction and contrast correction. This also enables optimum image display for each contents type. For example, for a movie image, which shows a low APL, gradations are changed using such a characteristic as a curve D shown in FIG. 15 to improve the expression by a low-gradation portion. For a sport image, which shows a high APL, gradations are changed using such a characteristic as a curve E in FIG. 15 to improve the expression by a high-gradation portion. For a news/report image, the image is displayed using a characteristic expressed as a straight line A in FIG. 15 without carrying out gradation conversion.

The gradation conversion process on an image signal invites a reduction in the number of expressible gradations due to the above reason. The display apparatus is, therefore, so configured as to vary a reference gradation voltage for driving a liquid crystal display panel in response to the input image signal. Specifically, a plurality of pieces of predetermined reference gradation voltage data are stored in the display apparatus, and the stored data are selected in changing the reference gradation voltage according to the genre of an image to be displayed. This allows execution of optimum gamma correction, contrast correction, etc., for each contents type.

Figure 15:
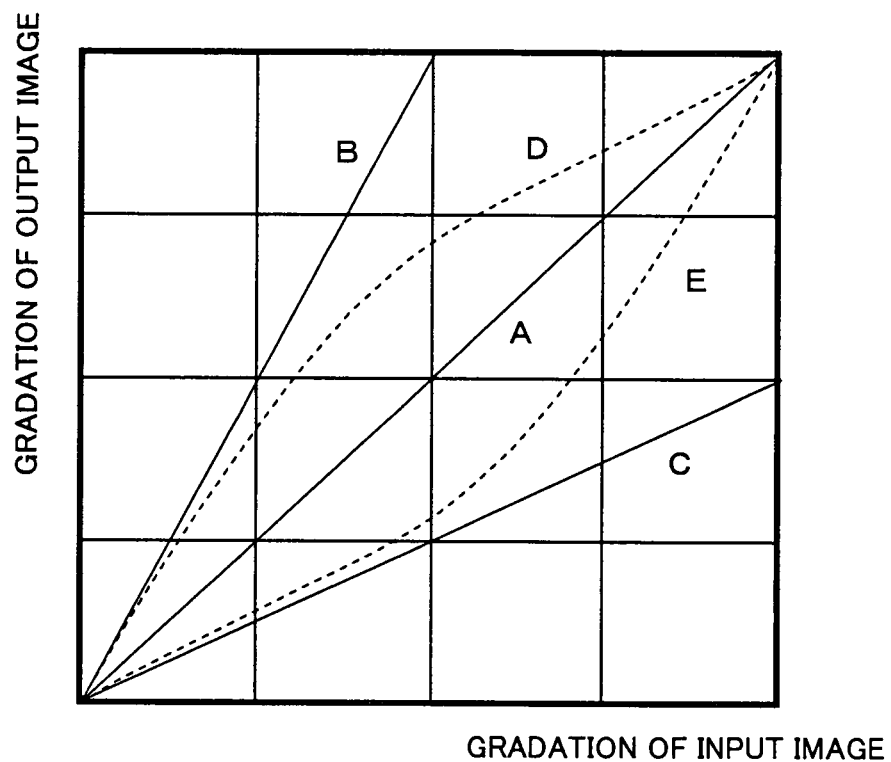
FIG. 15 is a diagram for explaining a gradation characteristic.

The linearity of luminance change characteristics, such as characteristics A, B and C, or nonlinearity of the same, such as characteristics D and E, as shown in FIG. 15, is not essential to the embodiments of the present invention.

The invention claimed is:

1. A liquid crystal display apparatus comprising:
   a liquid crystal panel that displays an image created by an input image signal,
   a luminance change storage unit for storing luminance change tables, wherein each luminance change table defines a luminance change characteristic, and
   a light source that emits light on the liquid crystal panel, the liquid crystal display apparatus controlling emission luminance of the light source on the basis of a characteristic quantity of the input image signal, wherein
   the liquid crystal display apparatus variably controls the emission luminance of the light source based on a change in the characteristic quantity of the input image signal,
   the liquid crystal display apparatus variably controls the emission luminance of the light source based on a classification of the image displayed on the liquid crystal panel,
   the liquid crystal display apparatus selects a luminance change table from the luminance change storage unit, and
   the liquid crystal display apparatus controls the emission luminance of the light source based on the luminance change characteristic defined by the selected luminance change table,
   wherein the liquid crystal display apparatus obtains said classification by receiving a broadcast signal including an electronic program information, where said liquid crystal display apparatus obtains said classification from the broadcast signal, and
   wherein the liquid crystal display apparatus obtains said classification by detecting a flag indicating said classification when an external device is connected to said liquid crystal display apparatus.

2. The liquid crystal display apparatus as defined in claim 1, further comprising:
   a characteristic quantity measuring portion that measures the characteristic quantity of the input image signal, and
   a filter that controls a rate of change in the characteristic quantity measured at the characteristic quantity measuring portion, wherein
   the filter carries out weighted averaging on a characteristic quantity in a current frame and past N frames (N is a natural number) to determine an output characteristic quantity, and wherein
   the liquid crystal display apparatus carries out control of the emission luminance of the light source based on the output characteristic quantity from the filter.

3. The liquid crystal display apparatus as defined in claim 2, wherein
   at least two classifications of images are displayed, and
   a value of the weighted averaging is changed according to each of the at least two classifications of the images displayed on the liquid crystal panel.

4. The liquid crystal display apparatus as defined in claim 2, wherein at least two classifications of images are displayed, and
   the liquid crystal display apparatus further comprising:
   a memory that stores a value of the weighted averaging for each classification of the at least two classifications of images displayed on the liquid crystal panel,
   wherein the value of the weighted averaging is changed according to each of the at least two classifications of the images displayed on the liquid crystal panel after the value of the weighted averaging is stored.

5. The liquid crystal display apparatus as defined in claim 2, wherein
   at least two classifications of images are displayed,
   a value of the weighted averaging is changed according to each of the at least two classifications of the images displayed on the liquid crystal panel, and
   N is varied based on the value of the weighted averaging after the value of the weighted averaging is changed according to each of the at least two classifications of the images displayed on the liquid crystal panel.

6. The liquid crystal display apparatus as defined in claim 2, wherein
   at least two classifications of images are displayed,
   a value of the weighted averaging is changed according to each of the at least two classifications of the images displayed on the liquid crystal panel, and
   weighting factors according to each classification of the at least two classifications of images displayed on the liquid crystal panel is varied based on the value of the weighted averaging after the value of the weighted averaging is changed according to each of the at least two classifications of the image displayed on the liquid crystal panel.

7. The liquid crystal display apparatus as defined in claim 1, wherein
   the characteristic quantity of the input image signal includes at least an average luminance level for one frame unit of the input image signal.

8. The liquid crystal display apparatus as defined in claim 1, wherein
the input image signal is expanded or compressed, and
the emission luminance of the light source is controlled.

9. The liquid crystal display apparatus as defined in claim 1, wherein
a gradation conversion characteristic for the input image signal is altered, and
the emission luminance of the light source is controlled.

10. The liquid crystal display apparatus as defined in claim 2, wherein
the characteristic quantity of the input image signal includes at least an average luminance level for one frame unit of the input image signal.

11. The liquid crystal display apparatus as defined in claim 3, wherein
the characteristic quantity of the input image signal includes at least an average luminance level for one frame unit of the input image signal.

12. The liquid crystal display apparatus as defined in claim 4, wherein
the characteristic quantity of the input image signal includes at least an average luminance level for one frame unit of the input image signal.

13. The liquid crystal display apparatus as defined in claim 5, wherein
the characteristic quantity of the input image signal includes at least an average luminance level for one frame unit of the input image signal.

14. The liquid crystal display apparatus as defined in claim 6, wherein
the characteristic quantity of the input image signal includes at least an average luminance level for one frame unit of the input image signal.

* * * * *